Oct. 27, 1964  B. B. DUNNE  3,154,014
METHOD OF AND APPARATUS FOR ACCELERATING GASES AND SOLIDS
Filed Oct. 27, 1961  2 Sheets-Sheet 1

Inventor
BRIAN B DUNNE
By Soans, Anderson, Luedeka + Fetel
Attys

Oct. 27, 1964  B. B. DUNNE  3,154,014
METHOD OF AND APPARATUS FOR ACCELERATING GASES AND SOLIDS
Filed Oct. 27, 1961  2 Sheets-Sheet 2
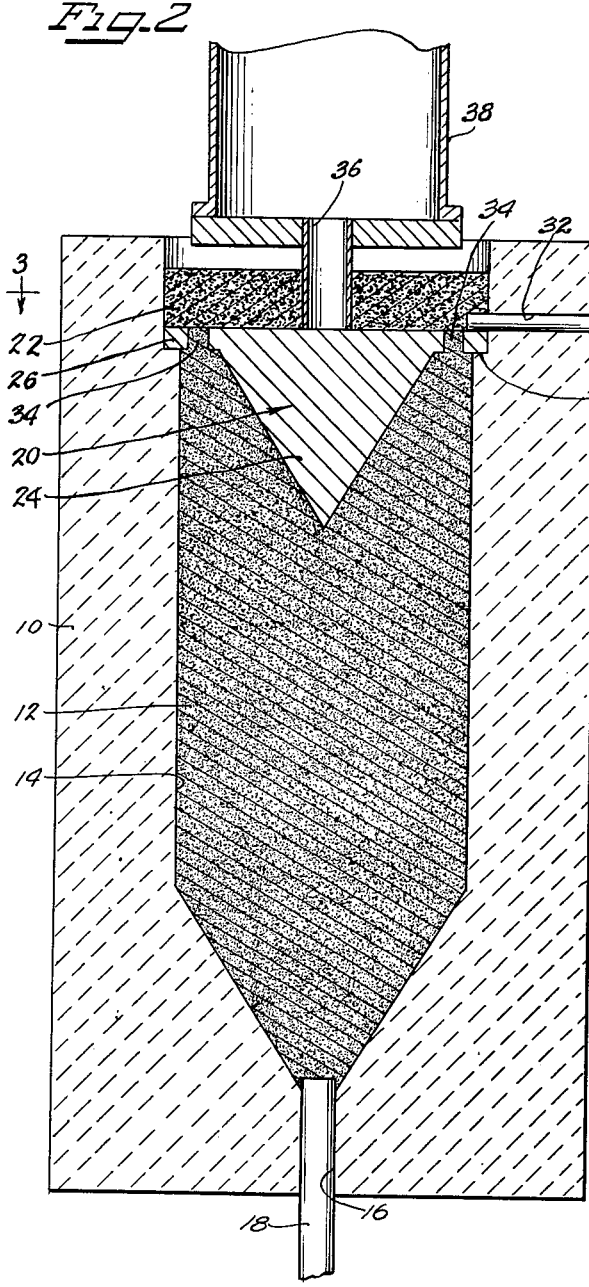
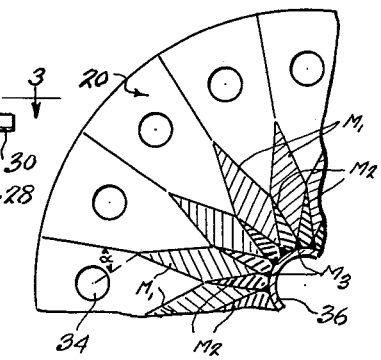
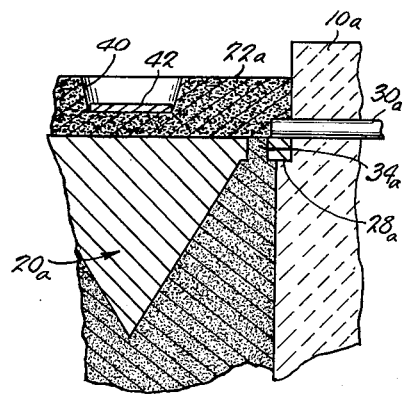
Inventor
BRIAN B DUNNE
By Dodds, Anderson, Luedeka + Fitch
Attys

United States Patent Office 3,154,014
Patented Oct. 27, 1964

3,154,014
METHOD OF AND APPARATUS FOR ACCELERATING GASES AND SOLIDS
Brian B. Dunne, La Jolla, Calif., assignor to General Dynamics Corporation, New York, N.Y., a corporation of Delaware
Filed Oct. 27, 1961, Ser. No. 148,196
10 Claims. (Cl. 102—23)

The present invention relates to a method of, and an apparatus for accelerating gases and solids, and more particularly, to a method of, and apparatus for, providing high pressure to impart very high velocities to gases, solid particles, and other objects.

In modern day technology, the development of high velocity gases or high velocity projectiles, plates, liners, etc., is becoming of increasing importance. For example, high pressures may be employed to accelerate gases to very high velocities for use in experimental research, particularly, in the fields of plasma physics, space physics, re-entry simulation, etc. Further, high pressures may be employed to accelerate solids in the form of metal plates, particles, shells, liners, projectiles, etc., to very high velocities for use in hypervelocity impact studies, in collapsing of liners for shaped charges, atomic weapons, etc.

It is an object of the present invention to provide an apparatus for imparting very high velocities to gases or solids. Another object of the invention is to provide a method of accomplishing that result. Another object is to provide a method of, and an apparatus for, utilizing explosives to impart extremely high velocities to gases or solids in a controllable fashion. A further object is to provide an apparatus for producing very high velocity gases or solids which is relatively inexpensive and compact.

Various other objects and advantages of the invention will become obvious from the following description when considered in conjunction with the accompanying drawings wherein:

FIGURE 2 is a fragmentary, schematic sectional side view of an apparatus for producing very high speed gases in accordance with the present invention;

FIGURE 4 is a diagramamtic representation of the indented pattern produced in the upper surface of the barrier shown in FIGURES 2 and 3 by the interaction of the detonation waves and the Mach waves; and FIGURE 5 is a fragmentary schematic sectional view of an apparatus for producing very high speed solids in accordance with the present invention.

Generally, a method for accelerating matter, in accordance with the present invention, includes the steps of preshocking a high explosive, and then passing a number of separate detonation fronts through the preshocked high explosive at such an angle relative to each other that a bridge or Mach wave is generated. The Mach wave is then employed to accelerate matter disposed in front of the same to very high velocity.

Figure 1:
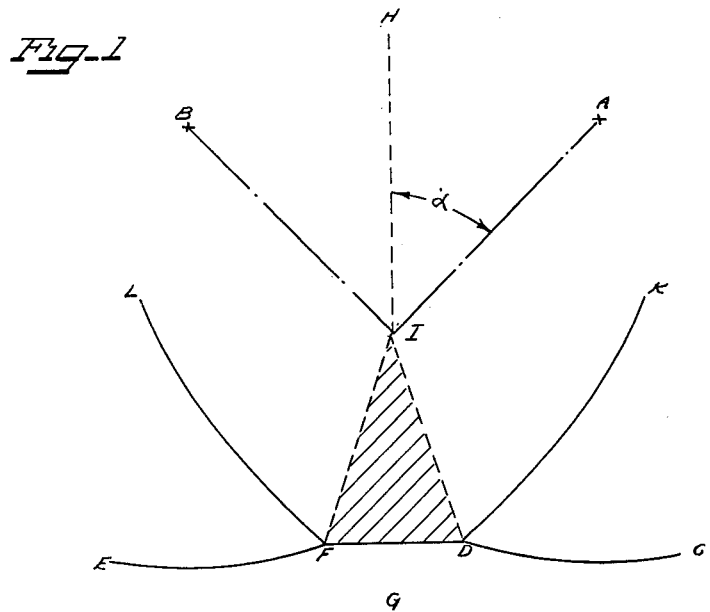
FIGURE 1 is a schematic view showing the geometry of the interacting detonation waves when a Mach or bridge wave, having higher pressure than the detonation wave, is produced.

More specifically, it has been found that if two separate detonation waves or fronts are passed through a preshocked high explosive and collide therein at an angle less than a certain critical angle, a bridge or Mach wave is generated having a higher pressure than the colliding detonation fronts. The geometry of the interacting detonation fronts from two separate sources, A and B, is diagrammatically illustrated in FIGURE 1. The two detonation fronts, which are shown as lines CD and EF, respectively, pass through the preshocked high explosive G and collide along line HI. When the angle ($\alpha$) between the line of collision and the positive normal of the respective detonation fronts becomes less than a certain critical value, a bridge or Mach wave, having higher pressure than the detonation fronts, is generated. The stem or length of the Mach wave line DF increases as the Mach wave propagates, the area passed over by the Mach stem being shaded in FIGURE 1. The collision of the two detonation fronts CD and EF also generates reflected shock waves KD and LF which pass through the detonation products.

For purposes of explanation, apparatus for generating and utilizing Mach waves is hereinafter described. The apparatus shown in FIGURE 2 is employed to accelerate gases and produce high velocity, high density plasmas.

Specifically, the apparatus shown in FIGURE 2 includes a hollow elongated cylindrical receptacle 10 which is loaded with a high explosive charge 12, which preferably has a high detonation velocity and high detonation pressure, such as, for example, composition B, composition C–4, or HMX in a binder. The receptacle 10 is made of a material which is chemically compatible with the high explosive and which has a lower propagation velocity than the high explosive. One suitable material is plaster. The receptacle 10 is shown in the drawings in an upright position (with its axis vertical), and for convenience the apparatus will be described hereinafter in that position.

As shown in FIGURE 2, the receptacle 10 is open at its upper end and closed at its lower end. The lower end of the cavity 14 in the receptacle 10 is tapered and is provided with a central aperture 16 for receiving a means for initiation of the explosive at that point such as a conventional electrical detonator 18 whereby one point detonation of the high explosive is obtained.

Disposed within the receptacle 10 is a barrier or element 20 which serves as a means for preshocking a high explosive charge 22 disposed above the barrier 20 and for redirecting the detonation front traveling through the lower high explosive charge 12. The barrier 20 is made of a solid material which is chemically compatible with the high explosive and which can transmit a shock wave imparted thereto. One such material is mild steel.

The illustrated barrier 20 includes a section 24 which is preferably conical in shape, and a circular flange or rim section 26 which is integrally connected to and extends outwardly from the base of the conical section 24. The barrier 20 is supported within the receptacle 10 by a shoulder 28 formed in the wall of the cavity 14 by an increased diameter portion thereof. The upper surface of the barrier 20, which is generally flat, is thereby disposed in a generally horizontal plane. The conical section 24 is generally coaxial with the receptacle 10 and extends downward toward the closed end thereof. The barrier 20 is preferably located a distance above the detonator 18 equal to at least several times the diameter of the conical section 24 so that the detonation front is moving approximately parallel to the axis of the receptacle 10 when it impinges on the conical section 24 and the detonation pressure has nearly reached the value it would attain with a very long receptacle.

The barrier 20 is retained in position by three removable pins or rods 30 of suitable material such as brass which extend through circumferentially spaced holes 32 in the wall of the receptacle 10. The inner ends of the pins 30 are positioned immediately above the upper surface of the flange section 26 so that the barrier 20 is held against the shoulder 28. By the above construction the lower end of the receptacle 10 may be loaded with the high explosive charge 12 and then the barrier 20 may be disposed in the receptacle 10 and locked in position.

Figure 3:
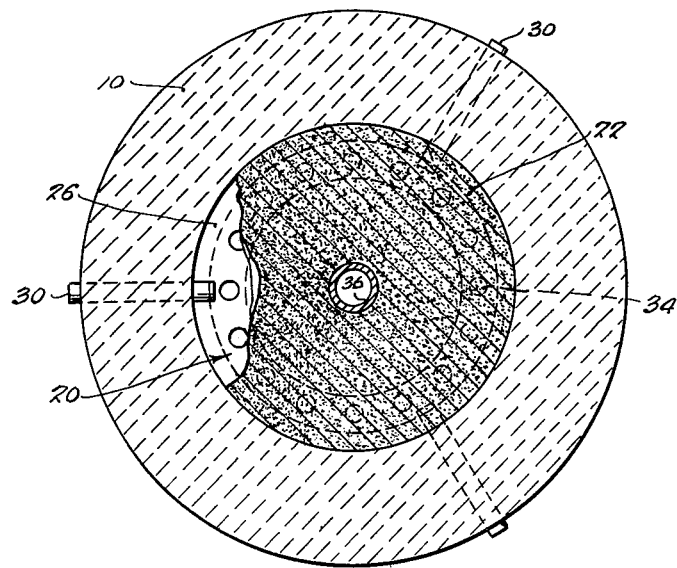
FIGURE 3 is a reduced, cross-sectional view taken generally along line 3—3 of FIGURE 2.

As shown particularly in FIGURE 3, the barrier 20 is provided with a number of small circumferentially spaced apertures or holes 34 extending through the flange section 26. These openings 34, which are loaded with high explosive, serve to divide the detonation front passing upward through the lower high explosive charge 12 into a plurality of fronts, the purpose of which is described hereinafter. The apertures 34 are located sufficiently inward from the edge of the barrier 20 so that they are not blocked by the shoulder 28.

In operation, the lower explosive charge 12 in the receptacle 10 is detonated by the detonator 18. A detonation front is produced which moves upward in the receptacle 10, parallel to its axis. The detonation front reflects obliquely from the conical section 24 of the barrier 20, producing a strong shock wave in the barrier 20. This shock wave, issuing from the flat upper surface of the barrier 20, passes into the upper high explosive charge 22, causing the high explosive to become pre-shocked, that is, compressed to a higher density and also heated. The high explosive is not preshocked to a degree or level at which it will undergo appreciable chemical reaction (not actively detonating) but is only shocked to a state of high temperature, density and pressure at which chemical reactions can readily proceed.

In addition to producing a shock in the barrier 20, the detonation front passes upward through the apertures 34 and issues into the upper charge 22 of explosive material as hemispherical detonation fronts, one front issuing from each aperture 34. These hemispherical fronts lag the shock wave emanating from the upper surface of the barrier 20. This time relationship is due to the geometry chosen and also to the delay of the detonation front in passing through the apertures 34, usually a delay of a few tenths of a microsecond. Thus, by the time the detonation fronts issuing from the apertures 34 pass into the upper charge 22 of explosive material, that material has been preshocked, so that these detonation fronts implode progressively toward the axis of the receptacle 10 with higher than normal detonation velocity and pressure.

The preshock wave can lead the detonation fronts by as much as several centimeters, and preferably by at least a few millimeters. The lead depends upon the preshock pressure, a suitable magnitude of this pressure being in the neighborhood of 50 kilobars. A pressure higher than this may cause the explosive in the upper charge to detonate.

The detonation pressure is then increased to a much greater level by the collision of any two of the hemispherical detonation fronts at an angle less than a certain critical value, as measured between the positive normal of the respective detonation fronts and the line of collision of the fronts at the point of collision. It has been found that the critical angle ($\alpha$ in FIGURE 4) between the detonation fronts in composition C-4 is 45°±2°. The critical angle is approximately the same for other conventional explosives having approximately the same propagation constant as composition C-4. Beyond this critical angle, a bridge or Mach wave is generated having a higher pressure than the colliding detonation fronts. When two of these resultant waves or Mach waves subsequently collide at an angle below the critical angle, a still higher pressure Mach wave is produced. Thus, extremely high detonation pressures can be produced within a relatively small system.

FIGURE 4 diagrammatically shows the indented pattern produced on the surface of the barrier by the chain of pressure build-up in the detonation fronts issuing from the apertures shown in FIGURES 2 and 3. The Mach waves of increased pressure resulting from the collision of the detonation fronts issuing from adjacent apertures 34 are designated $M_1$. The next higher pressure level waves, each produced by the collision of two Mach waves are designated $M_2$. The Mach waves resulting from the collision of Mach waves $M_2$ are designated $M_3$. The representation of FIGURE 3 is merely a partial picture, there being a number of Mach waves produced in the apparatus shown in FIGURES 1 and 2 which contribute to the pressure build-up which implodes progressively along the axis of the receptacle.

In the embodiment shown in FIGURES 2 and 3, the energy of the explosive is transferred to produce high velocity gas by a tubular liner 36 of a material which vaporizes to produce the desired gas when subjected to extremely high pressure and temperature. For example, monatomic carbon and hydrogen are produced when the liner is made of polyethylene. The liner 36 is positioned centrally on the flat upper surface of the barrier 20 with the high explosive charge 22 loaded in the receptacle about the liner 36. The upper end of the liner 36 is connected to a device 38 for utilizing the high velocity gas which is produced, such as a conventional evacuated chamber employed in diverse types of plasma research.

The resulting high pressure and temperature vaporize the liner 36 and the pressure then compresses the vaporized liner toward and along its axis. The liner forms a gaseous jet, which magnifies and accelerates the inward velocity of the liner by a factor between 2 and 30 and this highly compressed hot gas then expands into the evacuated chamber 38 at very high velocity. This high velocity gas may be used for a wide variety of purposes.

The direction and point of initiation of the Mach wave may be controlled by changing the position, the size of the holes and/or the spacing between the holes. The critical angle between detonation fronts, however, remains essentially constant and does not vary appreciably with changes in hole sizes or locations.

The embodiment of the invention shown in FIGURE 5 is employed to accelerate a circular plate to a very high velocity. The apparatus shown in FIGURE 5 is generally similar to that shown in FIGURE 2, and parts generally similar to those in FIGURE 2 are indicated with the same reference numeral with the subscrip "a." As shown in FIGURE 5, the liner of FIGURES 2 through 4 is replaced by a recess 40 in the upper charge 22a of high explosive. The recess 40 is circular in horizontal cross section and is tapered inwardly so that the progressively imploding Mach waves provide proper acceleration of a circular plate 42 disposed in the recess 40. The pressure of the Mach waves acting on the plate 42 causes the plate 42 to be propelled upward at a high velocity. A typical velocity obtained with such as system is greater than 0.5 in./$\mu$sec.

The apparatus shown in FIGURE 5 may be employed to accelerate particles, plates, pellets, discs, liners, projectiles, etc., to very high velocities by disposing the same in the recess, or in combination of recesses.

In one specific embodiment of the apparatus shown in FIGURE 2, a high explosive charge of composition C-4 is loaded in the receptacle which is made of plaster and which has an internal diameter of two inches. The length of the charge is about six inches. The barrier, which is constructed of mild steel and included a cone having a diameter of two inches and a height of two inches, is disposed in the receptacle with the apex of the cone approximately six inches from the bottom of the charge. Sixteen equally spaced holes with a diameter of one eighth of an inch are provided in the barrier on a radius of one and one-half inches. The liner is made of polyethylene and has a diameter of 0.5 inch, a thickness of 0.5 inch, and a length of one inch.

About one-half inch of explosive composition C-4, is loaded in the receptacle above the barrier and around the liner. The gas issuing from the end of the apparatus has a velocity of greater than 3 in./$\mu$sec., and a density of at least $10^{-4}$ gm./cc.

The disclosed apparatus provides extremely high pressures in a controllable fashion which can be employed to accelerate gases and/or solids. The explosive system is relatively small for the results obtained.

While the barrier is preferably conical in shape it should be realized that the barrier may be of a different shape as long as the detonation wave is delayed relative to the preshock wave.

Various other modifications may be made in the disclosed method and apparatus without departing from the spirit and scope of the invention.

Various features of the invention are set forth in the following claims.

What is claimed is:

1. A method of generating a high pressure for use in accelerating matter, comprising disposing matter to be accelerated in a high explosive, preshocking the high explosive, and passing at least two separate detonation fronts through said preshocked high explosive in a direction toward said matter and at an angle of approximately 90 degrees relative to each other whereby a Mach wave is generated by the interaction of the fronts and is directed at the matter to be accelerated.

2. A method of generating a high pressure for use in accelerating matter, comprising disposing matter to be accelerated in a high explosive, preshocking the high explosive, and passing at least a plurality of separate detonation fronts through said preshocked high explosive in a direction toward said matter and at an angle of approximately 90 degrees relative to each other whereby Mach waves are generated by the interaction of the fronts, and additional Mach waves are generated by the interaction of the Mach waves and are directed at the matter to be accelerated.

3. A method of generating a high pressure for use in accelerating matter, comprising disposing matter to be accelerated in one end of a cylindrical charge of high explosive, preshocking said charge in an axial direction, and passing at least two separate imploding detonation fronts through said preshocked charge at an angle of approximately 90 degrees relative to each other whereby the detonation fronts collide and generate Mach waves which are directed at the matter to be accelerated.

4. A method of generating a high pressure for use, in accelerating matter comprising disposing matter to be accelerated in a high explosive, detonating said high explosive to thereby provide a detonation front which passes through said high explosive toward said matter, employing said detonation front to preshock the high explosive adjacent said matter, separating said detonation front into at least two separate detonation fronts which pass through said preshocked high explosive in a direction toward said matter and at an angle of approximately 90 degrees relative to each other whereby at least one Mach wave is generated by the interaction of the fronts, and the Mach wave is directed at the matter to be accelerated.

5. A method of generating a high pressure for use in accelerating matter, comprising disposing matter to be accelerated in one end of a cylindrical charge of high explosive, preshocking said charge in an axial direction, and passing separate imploding detonation fronts through said preshocked charge at an angle relative to each other which is about 90 degrees, whereby the detonation fronts collide and generate higher pressure Mach waves which are directed at the matter to be accelerated.

6. An apparatus for accelerating matter comprising a receptacle defining a cavity, a charge of high explosive material in said cavity, detonating means in said receptacle for detonating the high explosive charge, means positioned intermediate the ends of said high explosive charge for translating a detonation front passing through said charge into a shock wave and communicating the same to the high explosive beyond said means, whereby said high explosive is preshocked, and means disposed in said high explosive charge before said preshocked portion thereof for separating the detonation front into at least two delayed detonation fronts which collide in said preshocked high explosive at an angle of approximately 90 degrees whereby a Mach wave is generated which accelerates matter positioned beyond said translating means to a high velocity.

7. An apparatus for accelerating matter comprising a receptacle defining a cavity, a charge of high explosive material in said cavity, detonating means in said receptacle for detonating the high explosive charge and thereby providing a detonation front passing through said charge, and a barrier disposed within said charge intermediate the ends thereof, said barrier being tapered toward said detonating means whereby the detonation front passing through said charge is translated into a shock wave which preshocks the high explosive beyond said barrier, at least two apertures in said barrier adjacent the wall of said receptacle, the distance between said apertures being such that detonation fronts issuing from said apertures collide in said preshocked high explosive at an angle of about 90 degrees whereby a Mach wave is generated which accelerates matter positioned beyond said barrier to a high velocity.

8. An apparatus comprising a receptacle having an elongated cylindrical cavity, said receptacle being closed at one end, a detonation means at said closed end, a translating element of solid material supported within said cavity, said element including a solid tapered section on the side of said element facing toward said closed end, which section is centrally located and is tapered toward said closed end, the face of said element opposite said closed end being generally flat, said element having a plurality of circumferentially spaced-apart apertures adjacent the wall of said cavity, a charge of high explosive in said cavity between said element and said detonation means, and a layer of high explosive material adjacent the flat face of said element, the distance between adjacent apertures being such that detonation fronts issuing from said apertures collide in said layer at an angle of about 90 degrees whereby Mach waves are generated which accelerate matter disposed in said layer to a high velocity.

9. An apparatus for accelerating gas comprising an elongated hollow cylinder having one end closed, detonating means at said closed end, a translating element supported within said cylinder intermediate the ends thereof, said element including a plate section traversing the interior of said cylinder and having one surface thereof disposed generally perpendicular to the axis of said cylinder and faced away from said closed end, and a conical section disposed in generally coaxial relationship with said cylinder, said conical section being connected at its base to said plate section on the side of said plate section opposite said flat surface, said element being longitudinally positioned relative to the detonating means so that the apex of said conical section is disposed at least several diameters of the base of the cone away from said detonating means, said element having a plurality of circumferentially spaced-apart apertures extending through said plate section adjacent the wall of said cylinder, a tubular liner disposed concentrically within said cylinder adjacent said flat surface of said element, a charge of high explosive in said cylinder between said element and said detonating means, and an additional charge of high explosive disposed in said cylinder adjacent the flat surface of said element and about said liner.

10. An apparatus for accelerating solids comprising an elongated hollow cylinder having one end closed, detonating means at said closed end, a translating element supported within said cylinder intermediate the ends thereof, said element including a plate section traversing the interior of said of cylinder and having one flat surface thereof disposed generally perpendicular to the axis of said cylinder and faced away from said closed end, and a conical section disposed in general coaxial relationship with said cylinder, said conical section being connected at its base to said plate section on the side of said plate section opposite said flat surface, said element being longitudinally positioned relative to said detonating means so that the apex of said conical section is disposed at least several diameters of the base of the cone away from said detonating means, said element having a plurality of circumferentially spaced apertures extending through said plate section adjacent the wall of said cylinder, a charge of high explosive in said cylinder between said element and said detonating means, and an additional charge of high explosive disposed in said cylinder adjacent the flat surface of said element, said additional charge having a centrally disposed recess therein for receiving the solid to be accelerated.

References Cited in the file of this patent

UNITED STATES PATENTS

| | | |
|---|---|---|
| 2,628,559 | Jasse | Feb. 17, 1953 |
| 2,892,407 | MacLeod | Jan. 30, 1959 |
| 2,900,905 | MacDougal | Aug. 25, 1959 |
| 2,988,994 | Fleischer | June 20, 1961 |
| 3,016,831 | Coursen | Jan. 16, 1962 |
| 3,027,838 | Meddick | Apr. 3, 1962 |

FOREIGN PATENTS

| | | |
|---|---|---|
| 785,155 | Great Britain | Oct. 23, 1957 |
| 341,743 | Switzerland | Nov. 30, 1959 |